United States Defensive Publication [19] (H) [11] T102,501

Croft [43] Dec. 7, 1982

[54] PROCESS OF PREPARING A POTASSIUM STANNATE-STANNIC OXIDE SOL TIN ELECTROPLATING SOLUTION

[76] Inventor: Richard Croft, Lakewood, Ohio

[21] Appl. No.: 322,378

[22] Filed: Nov. 17, 1981

Related U.S. Application Data

[63] Continuation of Ser. No. 198,620, Oct. 20, 1980, abandoned.

[51] Int. Cl.[3] ..... C25B 1/00

[52] U.S. Cl. ..... 204/96; 204/54 L; 204/86

[57] ABSTRACT

A process for the production of a stannic oxide sol-potassium stannate tin plating solution is disclosed comprising the steps of:

anodically dissolving stannous tin in a potassium electrolyte such as potassium hydroxide to form potassium stannite in a first electrolytic cell including an anode compartment and a cathode compartment;

simultaneously preventing the potassium stannite from migrating from the anode compartment to the cathode compartment by interposing therebetween a permselective ion exchange membrane (e.g., an anionic permselective membrane);

oxidizing said potassium stannite to form a potassium stannate-containing solution by suitable means such as by contacting an oxygen-containing gas with the potassium stannite in a scrubbing tower;

electrodialytically transferring potassium cations of said potassium stannate-containing solution from an anode compartment of a second electrolytic cell to a cathode compartment of said second electrolytic cell while simultaneously preventing migration of tin anions from said anode compartment to the cathode compartment by maintaining a cation permselective dialytic membrane between the anode and the cathode; and recovering a stannic oxide sol-potassium stannate solution from the anode compartment of said second electrolytic cell.

16 Claims, 1 Sheet Drawing,

22 Pages Specification

The file of this unexamined application may be inspected and copies thereof may be purchased (849 O.G. 1221, Apr. 9, 1968).

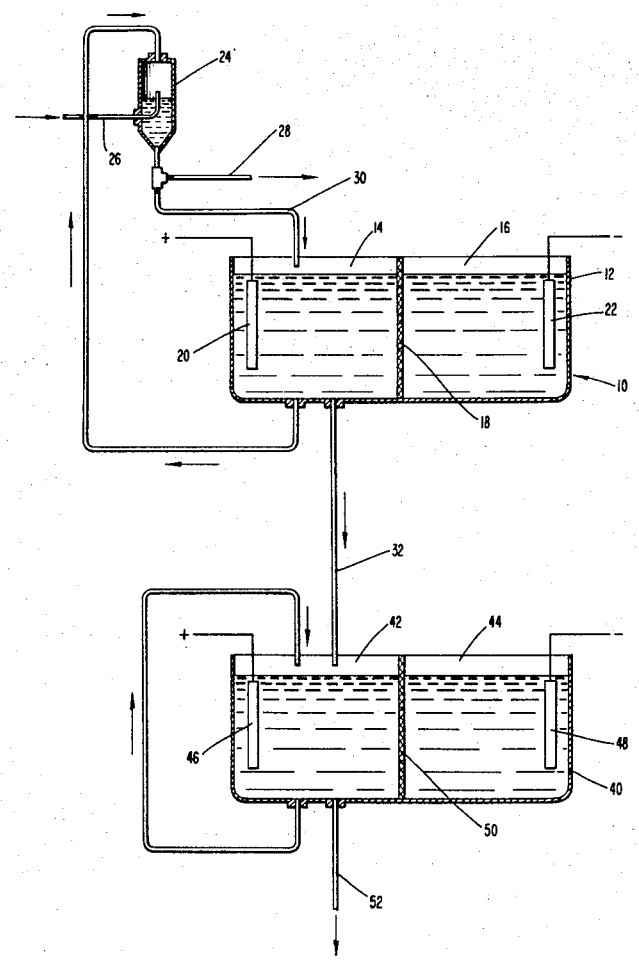

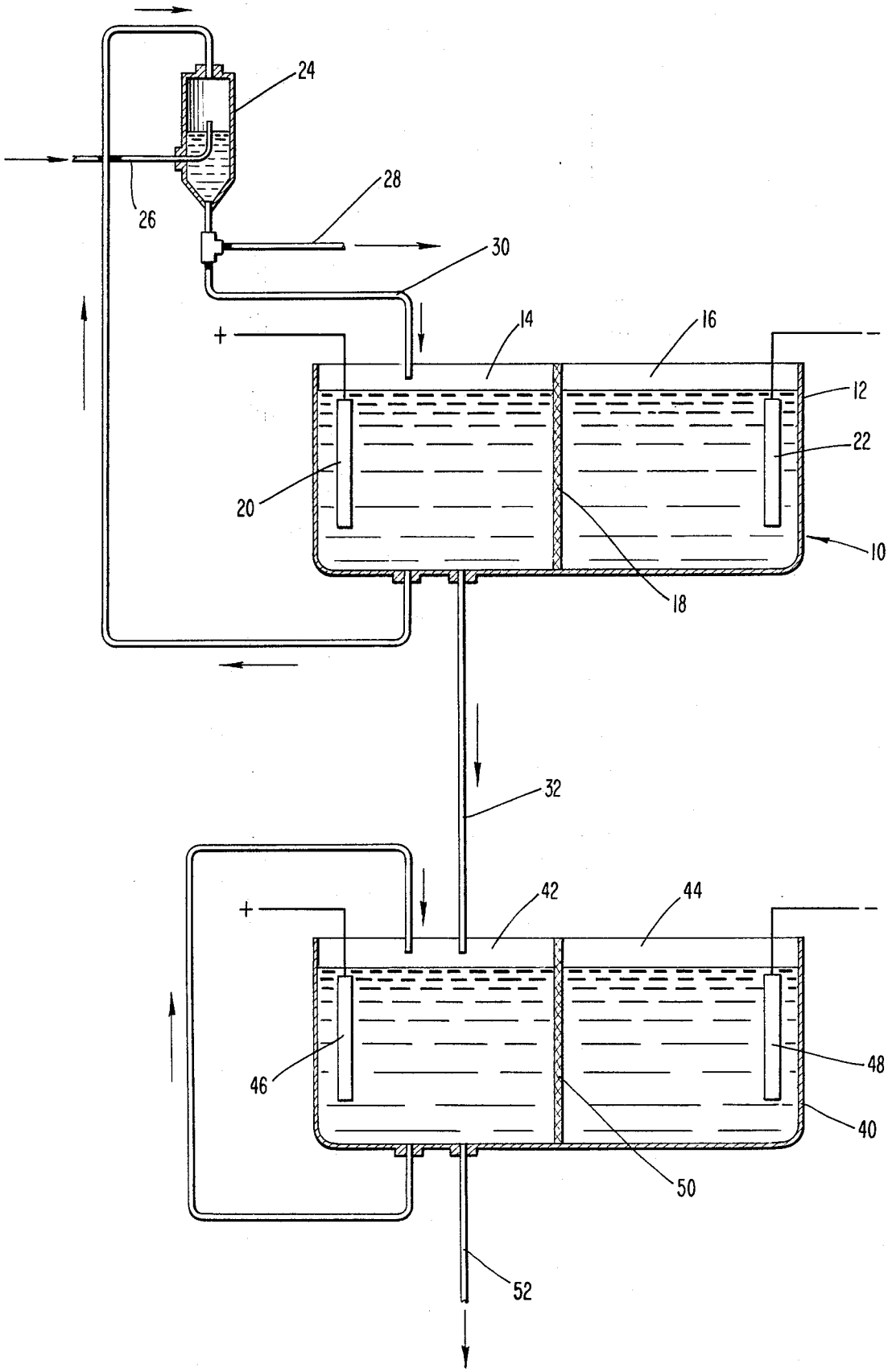
24
28
26
30
14
16
+
−
12
22
20
10
18
32
42
44
+
−
46
48
40
50
52